United States Patent [19]

Müller

[11] 3,722,107

[45] Mar. 27, 1973

[54] CIRCUIT ARRANGEMENT FOR CODE CHECKING AND CODE TRANSFORMING

[75] Inventor: Edwin Müller, Munich, Germany

[73] Assignee: Siemens Aktienqesellschaft, Berlin, Munich, Germany

[22] Filed: Mar. 5, 1971

[21] Appl. No.: 121,369

[30] Foreign Application Priority Data

Mar. 10, 1970 Germany....................P 20 11 310.4

[52] U.S. Cl. ....................340/347 DD, 340/146.1 AB

[51] Int. Cl. ................................................G06f 3/00

[58] Field of Search ......340/347, 146.1 AB; 235/153

[56] References Cited

UNITED STATES PATENTS

| | | | |
|---|---|---|---|
| 3,493,928 | 2/1970 | Juliusburger | 340/347 DD |
| 3,496,537 | 2/1970 | Will | 340/146.1 AB |
| 3,541,507 | 11/1970 | Duke | 340/347 DD |
| 3,348,198 | 10/1967 | Winter | 340/347 DD |
| 3,400,389 | 9/1968 | Heymann | 340/347 DD |

*Primary Examiner*—Thomas A. Robinson
*Assistant Examiner*—Jeremiah Glassman
*Attorney*—Birch, Swindler, McKie & Beckett

[57] ABSTRACT

A circuit is described for simultaneously performing code transformation and code checking operations, e.g. a "n" of "m" code may be transformed into a "1" of "z" code with simultaneous checking. The $z$ outputs of a code transformer can be reached over $n$ contacts of series - connected code relays. The contacts are activated in accordance with the "n" of "m" code combination stored in the relays. An error indicating relay, connectible to the $z$ outputs, is present and has an activating circuit which is completed only when the proper code formation is present.

5 Claims, 2 Drawing Figures

CIRCUIT ARRANGEMENT FOR CODE CHECKING AND CODE TRANSFORMING

BACKGROUND OF THE INVENTION

The invention pertains to a circuit arrangement for the transformation of an "n of m" code stored in a code relay into a "1 of z" with simultaneous code checking.

In the evaluation of information present in coded form, it is often necessary to transform the information which has arrived in a certain code into another code. Thus, for example, it is necessary in exchange installations (e.g. telephone exchanges), to transform dialing information, which arrives in the form of a "2 of 5" code, into a "1 of 10" code. It is known to combine such a code transformation operation with a checking of the code. In this context, there are no integrally constructed circuits available capable of performing both of these operations, which utilize a minimum of components. Circuit arrangements of this type generally require a substantial expenditure for relays and contacts especially when the information to be transformed is stored in code relays. Where relays are involved, the problem becomes particularly acute because a single relay can only reliably operate a limited number of contacts. Further, current can be conducted only over a limited number of contacts before there is sufficient current loss to prevent reliable detection of the output code.

It is an object of this invention to produce a circuit arrangement for code transformation and code checking which, in comparison with known circuit arrangements, requires only a small amount of component parts and which will transform and check a selected "n of m" code into a selected "1 of z" code.

Another object of this invention is to provide a relay operated code transformation and checking apparatus in which a minimum number of relay contacts are required to communicate signals to the output code terminals.

SUMMARY OF THE INVENTION

In the circuit according to the invention each of the z outputs of the code transformer can always be reached only over n contacts of the code relay, which contacts are activated according to the "n of m" code combination stored in the code relay and which contacts are series-connected. An error indicating switching means which can be connected to the $z$ outputs over a decoupling diode is present. The former element may advantageously be a relay having an activating circuit extending over one of the $z$ outputs which have been reached only in case of a correct development of the code.

The principle upon which a circuit arrangement in accord with the invention is based is that in case of "1 of z" output activated over $n$ contacts, and activating circuit for the error indicating switching means always exists over the contact on the rest position of the code relay which follows the last code relay activated by the "n of m" code combination. In contrast thereto, in case of error, a short circuit for the error indicating switching means exists over the contacts in the operating position of the code relay which follows the code relays activated by the "n of m" combination.

Accordingly, a significant characteristic of the arrangement in accord with the invention exists principally in that the checking of the "1 of z" code takes place using the code relay storing the "n of m" code. While a signal is available over the $n$ contacts in a series code relay configuration at the output of the code transformer triggered by at least $n$ code relays, it will be checked over the error indicating relay connected to the $z$ outputs of the code transforming device whether or not more than $n$ code relays have been activated.

In one advantageous embodiment, in case of erroneous multiple activation of the code relays, a bridging circuit is formed which shorts out the error indicating relay. In a further advantageous embodiment, in case of an erroneous multiple activation of the code relays, the activating circuit of the error indicating relay is interrupted.

BRIEF DESCRIPTION OF THE DRAWINGS

The invention will be best understood by reference to a description of alternate preferred embodiments constructed according to the principles of the invention given hereinbelow in conjunction with the drawings in which.

Figure 1:
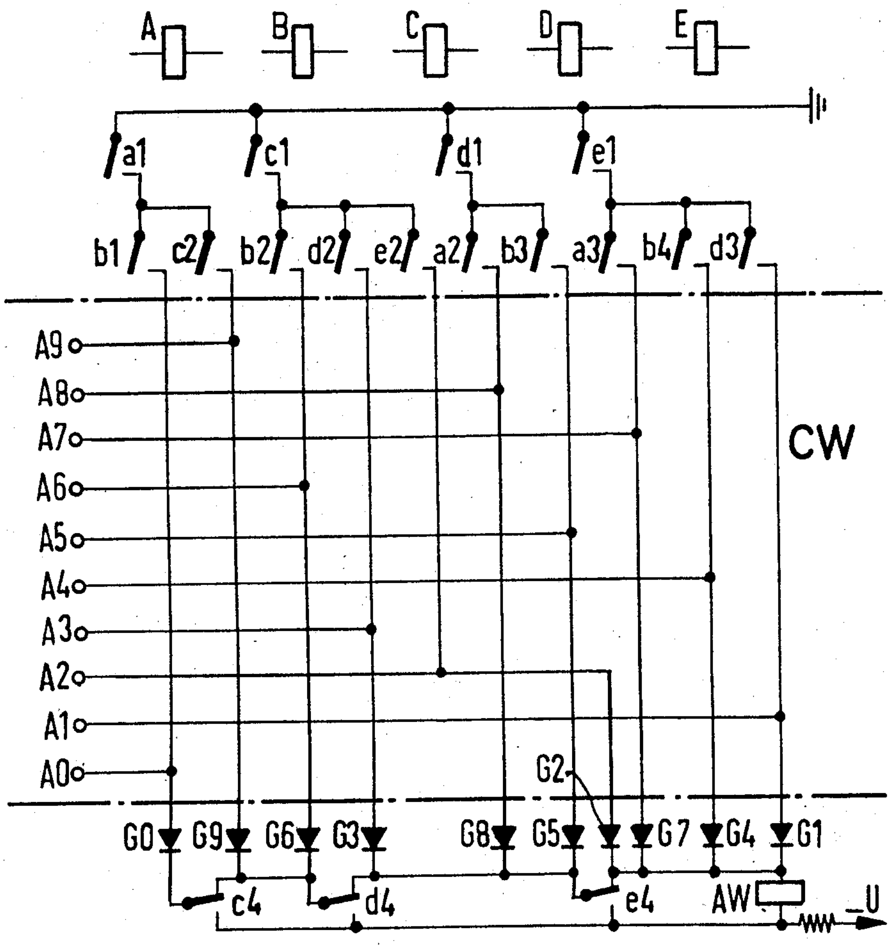
FIG. 1 is a schematic diagram of the preferred embodiment in which in case of an erroneous multiple activation of the code relays, the error indicating relay is short circuited and thereby drops out

The FIG. 1 circuit contains $m = 5$ relays, A through E, which can be activated for the representation of a code signal corresponding to a "2 of 5" code combination. Each of the code relays is assigned four contacts. Each of the $z = 10$ outputs, A0 through A9 of the code transformer CW can be reached over $n = 2$ contacts of the code relays in series. The output A0, for example, is reached over the activated contacts of the code relays A and B; namely, *a*1 and *b*1. The output A9, for example, is reached over the activated contacts of the code relays A and C; namely *a*1 and *c*2. Consequently, only one specified output A0 through A9 of the code transformer part CW is reached with the code relays activated by a "2 of 5" code combination. Accordingly, at these outputs, the information stored in the code relays A through E in a "2 of 5" code is available in the form of a "1 of 10" code. At the same time, the fact that one of the outputs A0 through A9 can be reached at all means that at least two of the code relays A through E are activated.

Each of the outputs A0 through A9 is connected with a second part of the code checking device over one of the decoupling diodes G0 through G9, respectively. This monitoring section contains an error indicating relay AW for which, in case of a correct code development, an activating circuit is always present. If, for example, the numeral 0 (11000) appears in 2 of 5 code, then the code relays A and B are activated, and the output A0 is reached over the activated contacts *a*1 and *b*1. At the outputs A0 through A9 of the code transformer CW the "1 of 10" code combination 1,000,000,000 corresponding to the numeral 0 is then available. At the same time, over the diode G0 and over the contacts of relays at rest (C,D,E) namely, *c*4, *d*4 and $e4$, which relays follow the last relays activated by the "2 of 5" code combination (A,B), there exists an activating circuit for the error indicating relay AW to power supply U. An erroneous code formation which expresses itself in a multiple activation of code relays means that at least a third code relay is activated, i.e., the contacts of a third relay are also engaged. In accord with the invention, such an error will be indicated in that the error indicating relay AW will drop out. In the example of FIG. 1, a short circuit across the error indicating relay AW will be formed in such a case.

Under the assumption that the code relays corresponding to the numeral 0 (11000), as well as the code relays corresponding to the numeral 3 (00110) are engaged, all of the contacts of the code relays A, B, C and D would be engaged. This would cause an activating circuit for the error indicating relay AW to be created over the contact $e4$ of the code relay E which is at the rest position and which follows the last code relay activated by the "2 of 5" code combination (this circuit may be constituted by ground, $d1$, $a2$, G8, $e4$, AW, −U or ground, $c1$, $d2$, G3, $e4$, AW, −U). At the same time, however, a short circuit for the error indicating relay AW is formed over the contacts $c4$ and $d4$ of the code relays C and D, which code relays follow the last code relays (A and B) activated by the "2 of 5" code combination (the circuits are formed by ground, $a1$, $c1$, $c2$, $b2$, G9, G6, $d4$, −U or ground, $a1$, $b1$, G0, $c4$, −U). The error resulting from the multiple activation of code relays will be indicated through the disengagement of the relay AW, as a result of the short circuit.

Figure 2:
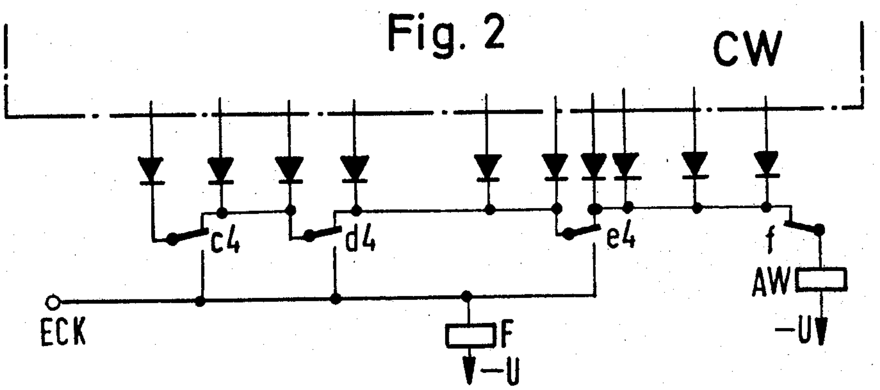
FIG. 2 is a partial schematic diagram of an alternate embodiment in which in case of an erroneous multiple activation of the code relays, the error indicating relay drops out through the interruption of its activating circuit.

According to the principles of the invention, it is possible to achieve the disengagement of the error indicating relay, as a result of an erroneous multiple activation of the code relays, by interrupting the activating circuit of the error indicating relay by means of a contact of a further relay. The alternate possibility is represented in the embodiment shown in FIG. 2. For the sake of clarity, FIG. 2 shows only the monitoring portion of the circuit which can be connected to the outputs of the code transformer CW of FIG. 1.

In addition to the error indicating relay AW, this embodiment contains a further relay, F, having a contact $f$ over which the activating circuit for the error indicating relay AW may be interrupted. In case of an erroneous multiple activation of the code relays, the contacts belonging to the smaller code combinations are activated. The relay F can be activated over at least one of these contacts; $c4$, $d4$ and $e4$. An incorrect code formation resulting from an erroneous multiple activation of the code relays causes the activating circuit for the error indicating relay AW to be interrupted by means of the contact $f$. The disengagement of the error indicating relay is then available as an error signal.

As an example, it is once again assumed that the code relays A, B, C and D corresponding to the numeral 0 (11000) as well as to the numeral 3 (00110) are activated. Accordingly, all of the contacts $a$, $b$, $c$ and $d$ assigned to these relays are engaged. The activating circuit for the relay AW would have been completed over the contacts $c1$ and $d2$ connected in series (FIG. 1), as well as over the diode, G3. At the same time there is, however, an activating circuit for the relay F over the contacts $a1$ and $b1$ (FIG. 1), as well as over the diode G0 and the contact $c4$ which is also activated. The contact $f$, thus engaged, interrupts the activating circuit for the error indicating relay AW. A further advantage of the arrangement according to FIG. 2 can be seen in that the relay F can also be activated by other code checking devices over an input ECK, that is, it can be centrally located for use by a plurality of code transformers.

The description of the preferred embodiments given hereinabove is only exemplary of the principles of the invention, and is no way limiting as to the scope of the invention. The scope of the invention is defined by the appended claims, and it will be clear that numerous modifications and changes may be made to the described embodiments and be within these claims.

I claim:

1. Apparatus for transformation of input information in the form of a first code to output information in the form of a second code and for simultaneously checking to insure that the correct code combination has been applied to the apparatus, comprising:
   - a plurality of relays for storing said information, when actuated in accordance with said first code,
   - code transformer means having a plurality of output terminals and a source of electrical energy, a predetermined number, in accordance with said second code, of said output terminals being connectable to said source through closed ones of first contacts of the actuated ones of said relays, the number of closed first contacts being no greater than the number of actuated relays,
   - means for indicating when a correct code combination is applied to said apparatus and
   - activating circuit means for energizIng said indicating means comprising second contacts of said relays, said activating circuit being completed through said second contacts only when a correct number of said relays are actuated in accordance with said first code.

2. The apparatus defined in claim 1 wherein deactivation of said indicating means indicates the application of an erroneous code combination to said relays, said second contacts being arranged to form a short circuit across said indicated means when an incorrect number of said relays are actuated thereby indicating the application of an incorrect code combination to said apparatus.

3. The apparatus defined in claim 1 wherein said first code is a "n" of "m" code, so that there are a number m of said relays, and said second code is a "l" of "z" code so that said code transformer means has a number $z$ outputs, said activating circuit being completed over the active one of said $z$ outputs.

4. The apparatus defined in claim 1 further comprising:
   - third switching means having an activating circuit which is completed by erroneous operation of at least one of said relays, said third switching means having a contact which interrupts the activating circuit of said indicating means upon activation of said third switching means.

5. The apparatus defined in claim 1 wherein the activating circuit is connected to the outputs of said code transformer means through decoupling diodes.

* * * * *